United States Patent
Macaro et al.

(10) Patent No.: US 11,704,388 B2
(45) Date of Patent: Jul. 18, 2023

(54) DISAGGREGATION SYSTEM

(71) Applicant: SAS Institute Inc., Cary, NC (US)

(72) Inventors: Christian Macaro, Munich (DE); Fedor Reva, Guadalajara (ES); Rocco Claudio Cannizzaro, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/862,510

(22) Filed: Jul. 12, 2022

(65) Prior Publication Data
US 2023/0185883 A1    Jun. 15, 2023

Related U.S. Application Data (60) Provisional application No. 63/308,570, filed on Feb. 10, 2022, provisional application No. 63/289,559, filed on Dec. 14, 2021.

(51) Int. Cl.
| | |
|---|---|
| *G06F 17/11* | (2006.01) |
| *G06F 18/2413* | (2023.01) |
| *G06Q 10/0635* | (2023.01) |
| *G06F 18/2411* | (2023.01) |
| *G06F 18/23213* | (2023.01) |

(52) U.S. Cl.
CPC ........ *G06F 18/24137* (2023.01); *G06F 17/11* (2013.01); *G06F 18/23213* (2023.01); *G06F 18/2411* (2023.01); *G06Q 10/0635* (2013.01)

(58) Field of Classification Search
CPC ...................................................... G06F 17/11
See application file for complete search history.

(56) References Cited

U.S. PATENT DOCUMENTS

| | | | |
|---|---|---|---|
| 8,892,392 B2 * | 11/2014 | Perala | G01S 19/072 |
| | | | 701/445 |
| 9,672,193 B2 | 6/2017 | Macaro et al. | |
| 9,710,428 B2 | 7/2017 | Macaro et al. | |
| 10,095,660 B2 | 10/2018 | Macaro et al. | |

(Continued)

OTHER PUBLICATIONS

D. Raphaeli, "Distribution of noncentral indefinite quadratic forms in complex normal variable," May 1996, IEEE Transaction in Information Theory, vol. 42, pp. 1002-1007 (Year: 1996).*

(Continued)

*Primary Examiner* — Michael D. Yaary
(74) *Attorney, Agent, or Firm* — Bell & Manning, LLC (57) ABSTRACT

A computing device determines a disaggregated solution vector of a plurality of variables. A first value is computed for a known variable using a predefined density distribution function, and a second value is computed for an unknown variable using the computed first value, a predefined correlation value, and a predefined aggregate value. The predefined correlation value indicates a correlation between the known variable and the unknown variable. A predefined number of solution vectors is computed by repeating the first value and the second value computations. A solution vector is the computed first value and the computed second value. A centroid vector is computed from solution vectors computed by repeating the computations. A predefined number of closest solution vectors to the computed centroid vector are determined from the solution vectors. The determined closest solution vectors are output.

30 Claims, 9 Drawing Sheets

(56) References Cited

U.S. PATENT DOCUMENTS

| | | |
|---|---|---|
| 10,146,741 B2 | 12/2018 | Macaro et al. |
| 11,010,451 B2 | 5/2021 | Macaro et al. |
| 11,016,871 B1 | 5/2021 | Cannizzaro et al. |

OTHER PUBLICATIONS

Zhang, Yongli, and Svetlozar Rachev. "Risk attribution and portfolio performance measurement-an overview." University of Karlsruhe, D-76128 Karlsruhe, Germany and Department of Statistics and Applied Probability University of California, Santa Barbara, CA93106, USA 185 (2004).

Franzén, Jessica. Bayesian cluster analysis: some extensions to non-standard situations. Diss. Statistiska institutionen, 2008.

Beta Distribution. Wikipedia. Mar. 9, 2022. https://en.wikipedia.org/wiki/Beta_distribution.

Sharpe, William F. "Capital asset prices: A theory of market equilibrium under conditions of risk." The journal of finance 19.3 (1964): 425-442.

* cited by examiner

DISAGGREGATION SYSTEM

CROSS-REFERENCE TO RELATED APPLICATIONS

The present application claims the benefit of and priority under 35 U.S.C. § 119(e) to U.S. Provisional Patent Application No. 63/308,570 filed on Feb. 10, 2022, and to U.S. Provisional Patent Application No. 63/289,559 filed on Dec. 14, 2021, the entire contents of which are hereby incorporated by reference.

BACKGROUND

Machine learning models may be designed to compute a performance measure value for a simulated system. However, the performance measure value may need to be disaggregated to define component values that refer to a more granular level of aggregation that is not evaluated in the model.

SUMMARY

In an example embodiment, a non-transitory computer-readable medium is provided having stored thereon computer-readable instructions that, when executed by a computing device, cause the computing device to determine a disaggregated solution vector for a plurality of variables. A first value is computed for a known variable using a predefined density distribution function, and a second value is computed for an unknown variable using the computed first value, a predefined correlation value, and a predefined aggregate value. The predefined correlation value indicates a correlation between the known variable and the unknown variable. A predefined number of solution vectors is computed by repeating the first value and the second value computations. A solution vector is the computed first value and the computed second value. A centroid vector is computed from solution vectors computed by repeating the computations. A predefined number of closest solution vectors to the computed centroid vector are determined from the solution vectors. The determined closest solution vectors are output.

In yet another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to determine a disaggregated solution vector for a plurality of variables.

In an example embodiment, a method of determining a disaggregated solution vector of a plurality of variables is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

A disaggregation application 122 disaggregates performance measure values to define component values that refer to a more granular level of aggregation that is not evaluated in the model. For example, disaggregation application 122 may be used to disaggregate investments in in financial instruments as part of portfolio optimization. As another example, disaggregation application 122 may be used to disaggregate potential fraud investigations possibly applied to different lines of business or other operation clusters, where different investigation types have a different cost.

As another example, disaggregation application 122 may be used to disaggregate allocation of resources in manufacturing industries as part of product optimization. For illustration, when a company needs to allocate resources to obtain a desired production level, utility functions might help identify a unique solution, however, randomness and inaccuracy of the models may suggest a tolerance associated with achieving the solution. In this situation, a limited subset of solutions may be available to achieve the solution. The analysis is complicated by the economies of scales that are essentially equivalent to a correlation matrix.

As yet another example, disaggregation application 122 may be used to disaggregate sales as part of performance optimization. Sales are typically affected by several factors such as a number of salespeople, a number of advertisements, number of sales offices, etc. Again, utility functions may help identify a unique solution, but randomness and inaccuracy of the models may suggest a tolerance associated with achieving the solution allowing selection of a limited subset of solutions. Again, the analysis is complicated by the economies of scales that are essentially equivalent to a correlation matrix.

Figure 1:
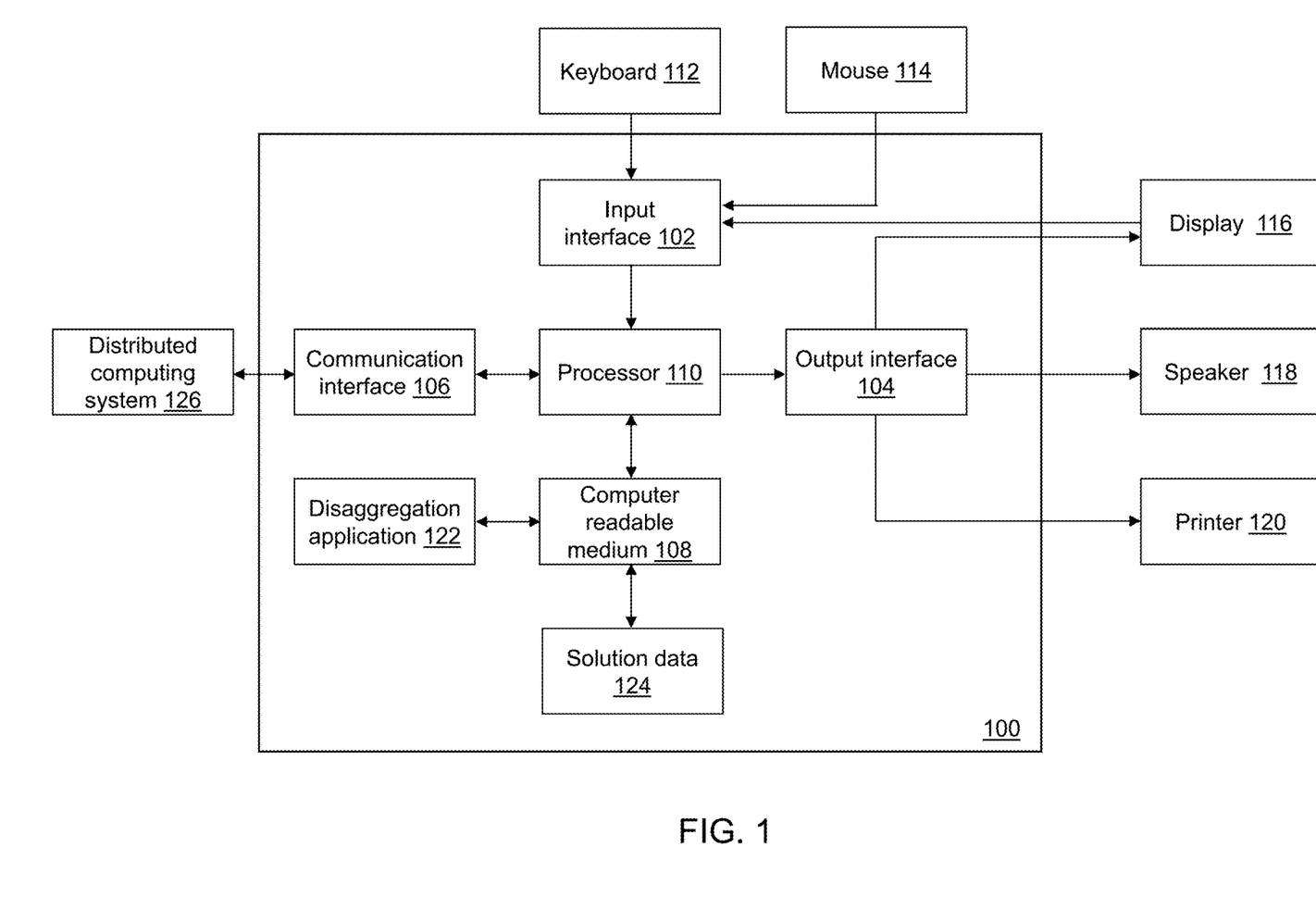
FIG. 1 depicts a block diagram of a disaggregation device in accordance with an illustrative embodiment.

Referring to FIG. 1, a block diagram of disaggregation device 100 is shown in accordance with an illustrative embodiment. Disaggregation device 100 may include an input interface 102, an output interface 104, a communication interface 106, a non-transitory computer-readable medium 108, a processor 110, disaggregation application 122, and solution data 124. Fewer, different, and/or additional components may be incorporated into disaggregation device 100.

Input interface 102 provides an interface for receiving information from the user or another device for entry into disaggregation device 100 as understood by those skilled in the art. Input interface 102 may interface with various input technologies including, but not limited to, a keyboard 112, a mouse 114, a display 116, a track ball, a keypad, one or more buttons, etc. to allow the user to enter information into disaggregation device 100 or to make selections presented in a user interface displayed on display 116.

The same interface may support both input interface 102 and output interface 104. For example, display 116 comprising a touch screen provides a mechanism for user input and for presentation of output to the user. Disaggregation device 100 may have one or more input interfaces that use the same or a different input interface technology. The input interface technology further may be accessible by disaggregation device 100 through communication interface 106.

Output interface 104 provides an interface for outputting information for review by a user of disaggregation device 100 and/or for use by another application or device. For example, output interface 104 may interface with various output technologies including, but not limited to, display 116, a speaker 118, a printer 120, etc. Disaggregation device 100 may have one or more output interfaces that use the same or a different output interface technology. The output interface technology further may be accessible by disaggregation device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Disaggregation device 100 may have one or more communication interfaces that use the same or a different communication interface technology. For example, disaggregation device 100 may support communication using an Ethernet port, a Bluetooth antenna, a telephone jack, a USB port, etc. Data and/or messages may be transferred between disaggregation device 100 and another computing device of a distributed computing system 126 using communication interface 106.

Non-transitory computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Disaggregation device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Disaggregation device 100 also may have one or more drives that support the loading of a memory media such as a CD, DVD, an external hard drive, etc. One or more external hard drives further may be connected to disaggregation device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Disaggregation device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Disaggregation application 122 performs operations associated with computing solution data 124 that includes one or more possible solution vectors. Some or all of the operations described herein may be embodied in disaggregation application 122. The operations may be implemented using hardware, firmware, software, or any combination of these methods.

Referring to the example embodiment of FIG. 1, disaggregation application 122 is implemented in software (comprised of computer-readable and/or computer-executable instructions) stored in computer-readable medium 108 and accessible by processor 110 for execution of the instructions that embody the operations of disaggregation application 122. Disaggregation application 122 may be written using one or more programming languages, assembly languages, scripting languages, etc. Disaggregation application 122 may be integrated with other analytic tools. As an example, disaggregation application 122 may be part of an integrated data analytics software application and/or software architecture such as that offered by SAS Institute Inc. of Cary, N.C., USA. Merely for illustration, disaggregation application 122 may be implemented using or integrated with one or more SAS software tools such as SAS® Solution for Stress Testing, JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Disaggregation application 122 may be implemented as a Web application. For example, disaggregation application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Figure 2A:
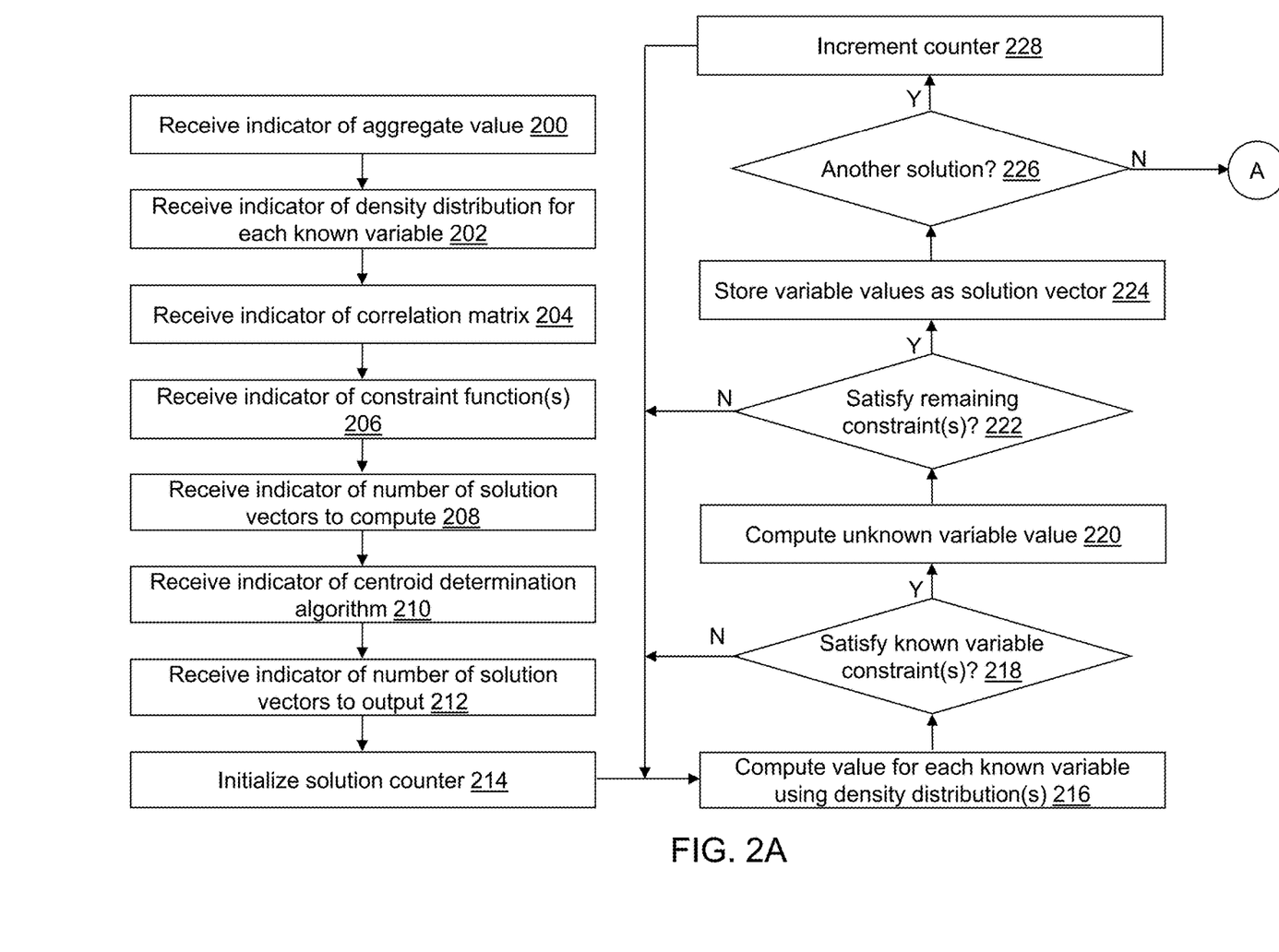
FIGS. 2A through 2C depict a flow diagram illustrating examples of operations performed by a disaggregation application of the disaggregation device of FIG. 1 in accordance with an illustrative embodiment.
Figure 2B:
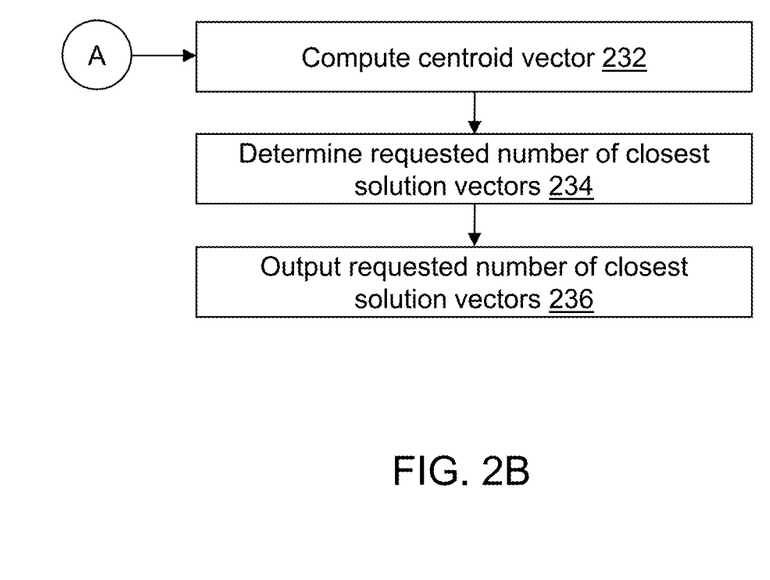
Figure 2C:
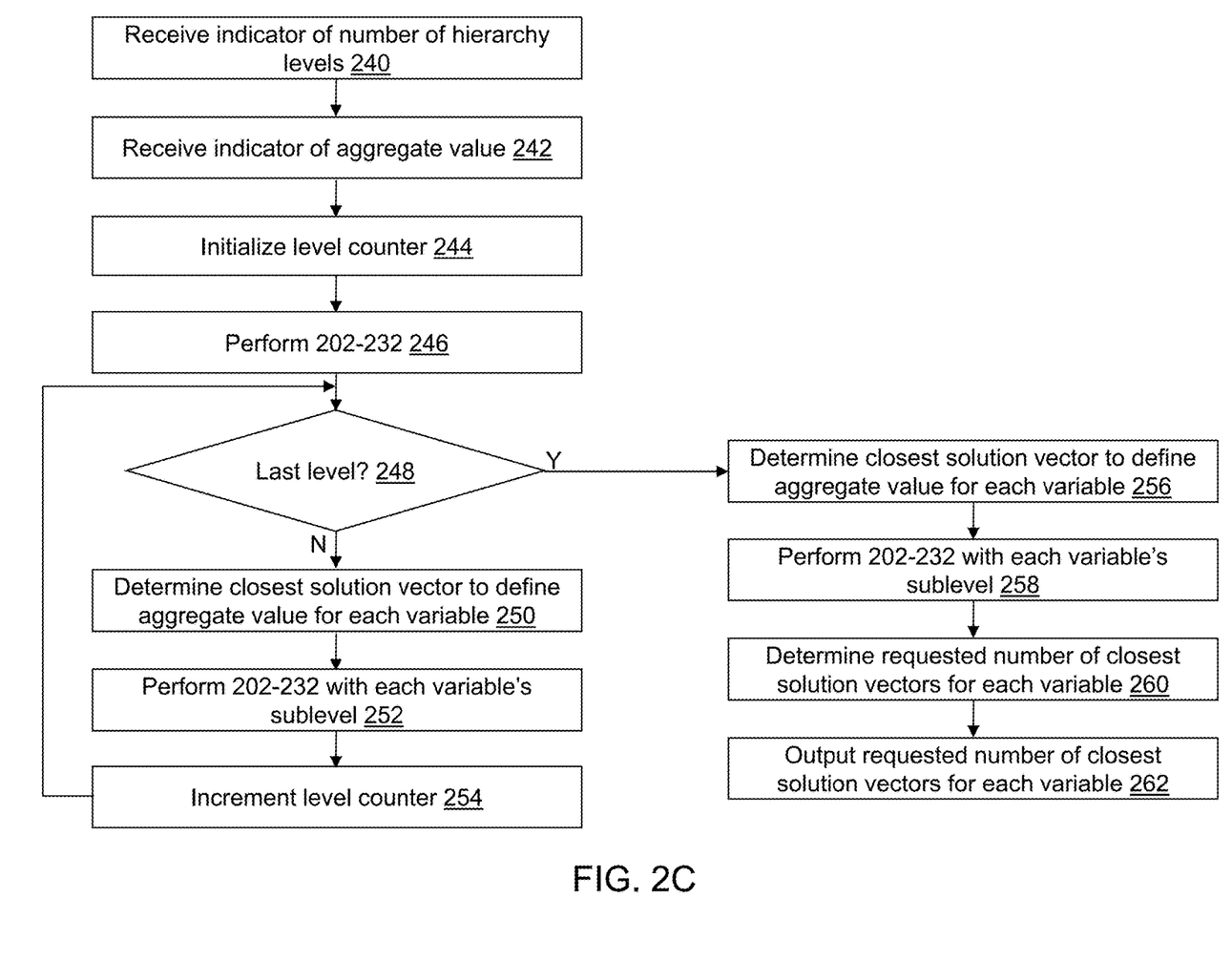

Referring to FIGS. 2A through 2C, example operations associated with disaggregation application 122 are described. Additional, fewer, or different operations may be performed depending on the embodiment of disaggregation application 122. The order of presentation of the operations of FIGS. 2A through 2C is not intended to be limiting. Some of the operations may not be performed in some embodiments. Although some of the operational flows are presented in sequence, the various operations may be performed in various repetitions and/or in other orders than those that are illustrated. For example, a user may execute disaggregation application 122, which causes presentation of a first user interface window, which may include a plurality of menus and selectors such as drop-down menus, buttons, text boxes, hyperlinks, etc. associated with disaggregation application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by disaggregation application 122. Some of the operational flows further may be performed in parallel, for example, using a plurality of threads and/or a plurality of computing devices such as may be included in distributed computing system 126.

Referring to FIG. 2A, in an operation 200, a first indicator is received that indicates an aggregate value. For illustration, the aggregate value may have been computed using a simulation to represent a performance measure value for a modeled system. For example, the system may be a total loss for a financial system, a total profit for a financial system, a total error for a modeled system such as a manufacturing system, etc. For illustration, the aggregate value may be a total value at risk or a total product resource allocation.

In an operation 202, a second indicator may be received that indicates a density distribution function and the associated distribution parameters for each known variable. There may be one or more known variables, where a density distribution function and its associated distribution parameters may be defined for each known variable of the one or more known variables. For example, the second indicator may indicate a name of a distribution function with its associated distribution parameters in association with each known variable. The indicated distribution function and its distribution parameters describe a density function for the associated variable of the one or more known variables. The second indicator may be received by disaggregation application 122 after selection from a user interface window or after entry by a user into a user interface window. As an example, a density distribution function may be selected from "Gaussian", "Uniform", "Beta", etc. A default value for the distribution function may further be stored, for example, in computer-readable medium 108. For example, a default density distribution function may be the Beta function. Of course, the density distribution function may be labeled or selected in a variety of different manners by the user as understood by a person of skill in the art.

In an alternative embodiment, the density distribution function may not be selectable, and a single density distribution function is implemented by disaggregation application 122. For example, the Beta function may be used without allowing a user selection. In this embodiment, only the Beta distribution parameters may be indicated using the second indicator for each known variable of the one or more known variables.

With the selection of the density distribution function, parameters associated with the selected density function may be provided using the second indicator. For example, when the Gaussian function is used, a mean value, a variance value, a minimum value, and a maximum value may be provided. As another example, when the Beta function is used, a first shape parameter value, a second shape parameter value, a minimum value, and a maximum value may be provided. Merely for illustration, the second indicator may comprise $X_1$, Beta, 2.1, 2.2, 0, 10 for a first known variable and $X_2$, Beta, 2.0, 1.8, 0, 10 for a second known variable where the first value represents a known variable indicator, the second value represents the density distribution function, the third value represents the first shape parameter value, the fourth value represents the second shape parameter value, the fifth value represents the minimum value, and the sixth value represents the maximum value. Of course, the specification of the density distribution function may be performed in other manners.

In an operation 204, a third indicator may be received that indicates a plurality of correlation values that define a correlation between each known variable of the one or more known variables and an unknown variable. For example, when there are two known variables, there are three correlation values, one correlation value between the first known variable and the second known variable, one correlation value between the first known variable and the unknown variable, and one correlation value between the second known variable and the unknown variable. A correlation matrix $\rho$ may be defined using the plurality of correlation values. For example, the correlation matrix $\rho$ may be defined using $$\rho = \begin{bmatrix} 1 & \rho_1 & \rho_2 \\ \rho_1 & 1 & \rho_3 \\ \rho_2 & \rho_3 & 1 \end{bmatrix}$$

where $\rho_1$ indicates the correlation value between the first known variable and the second known variable, $\rho_2$ indicates the correlation value between the first known variable and the unknown variable, and $\rho_3$ indicates the correlation value between the second known variable and the unknown variable. The correlation matrix $\rho$ has dimension $N_v \times N_v$, where $N_{84}$ indicates a total number of known and unknown variables and $N_v=N_{vK}+1$, where $N_{vK}$ indicates a number of the one or more known variables.

In an operation 206, a fourth indicator may be received that indicates zero or more constraint functions defined using one or more of the known variables and/or the unknown variable. The fourth indicator may be received by disaggregation application 122 after selection from a user interface window or after entry by a user into a user interface window. Illustrative constraints functions may include $X_1>0$; $X_2>2$; $X_U>2$; $X_1+X_2 \geq 4X_U$; etc., where $X_U$ indicates the unknown variable. The one or more constraint functions impose qualitative rules on possible values of each variable as well as optionally a relationship between the possible values. For example, a subject matter expert may define the zero or more constraint functions.

In an operation 208, a fifth indicator of a number of solution vectors to compute $N_s$ may be received. In an alternative embodiment, the fifth indicator may not be received. For example, a default value may be stored, for example, in computer-readable medium 108 and used automatically. In another alternative embodiment, the value of number of solution vectors to compute $N_s$ may not be selectable. Instead, a fixed, predefined value may be used. For illustration, a default value of the number of solution vectors to compute $N_s$ may be 1000.

In an operation 210, a sixth indicator of a centroid determination algorithm is received. The centroid determination algorithm determines a centroid of a set of solution vectors. For example, the sixth indicator indicates a name of a centroid determination algorithm. The sixth indicator may be received by disaggregation application 122 after selection from a user interface window or after entry by a user into a user interface window. A default value for the centroid determination algorithm may further be stored, for example, in computer-readable medium 108. In an alternative embodiment, the centroid determination algorithm may not be selectable. Instead, a single centroid determination algorithm is implemented using disaggregation application 122. An example centroid determination algorithm is a k-means clustering algorithm though any multivariate scoring function that can rank sets of solution vectors from a statistical point of view can be used.

In an operation 212, a seventh indicator of a number of solutions to output $N_o$ may be received. In an alternative embodiment, the seventh indicator may not be received. For example, a default value may be stored, for example, in computer-readable medium 108 and used automatically. In another alternative embodiment, the value of number of solutions to output $N_o$ may not be selectable. Instead, a fixed, predefined value may be used. For illustration, a default value of the number of solutions to output $N_o$ may be 10.

In an operation 214, a solution counter I is initialized, for example, as I=1.

In an operation 216, a value is computed for each known variable of the one or more known variables using the density distribution function defined for each known variable in operation 202. For example, referring to FIG. 3, a density is shown for two known variables $X_1$ and $X_2$ in accordance with an illustrative embodiment. The density was defined based on a beta distribution with the first shape parameter value equal to 2, the second shape parameter value equal to 2, the minimum value equal to 0, and the maximum value equal to 10 for both known variables $X_1$ and $X_2$.

Figure 3:
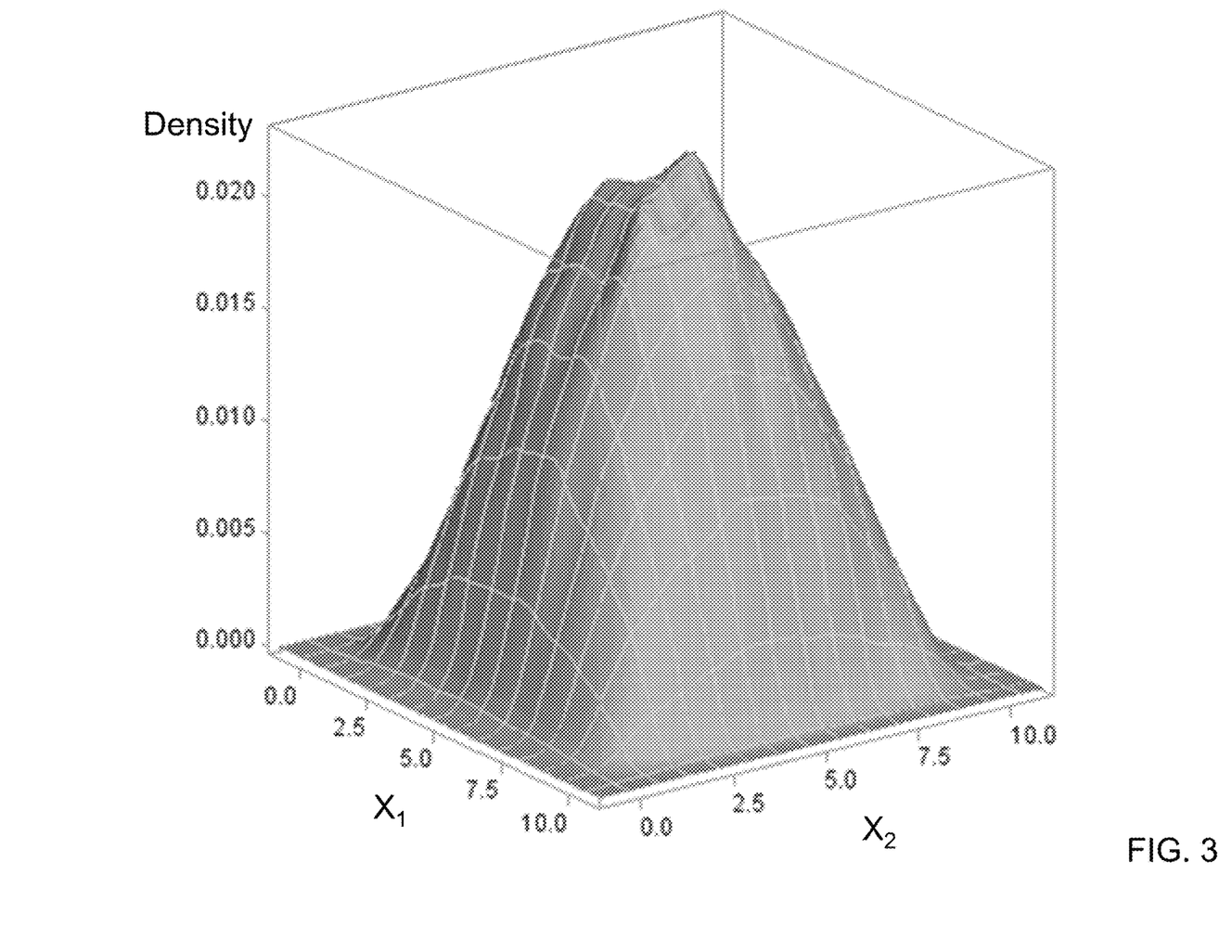
FIG. 3 depicts a density function defined for two known variables in accordance with an illustrative embodiment.
Figure 4:
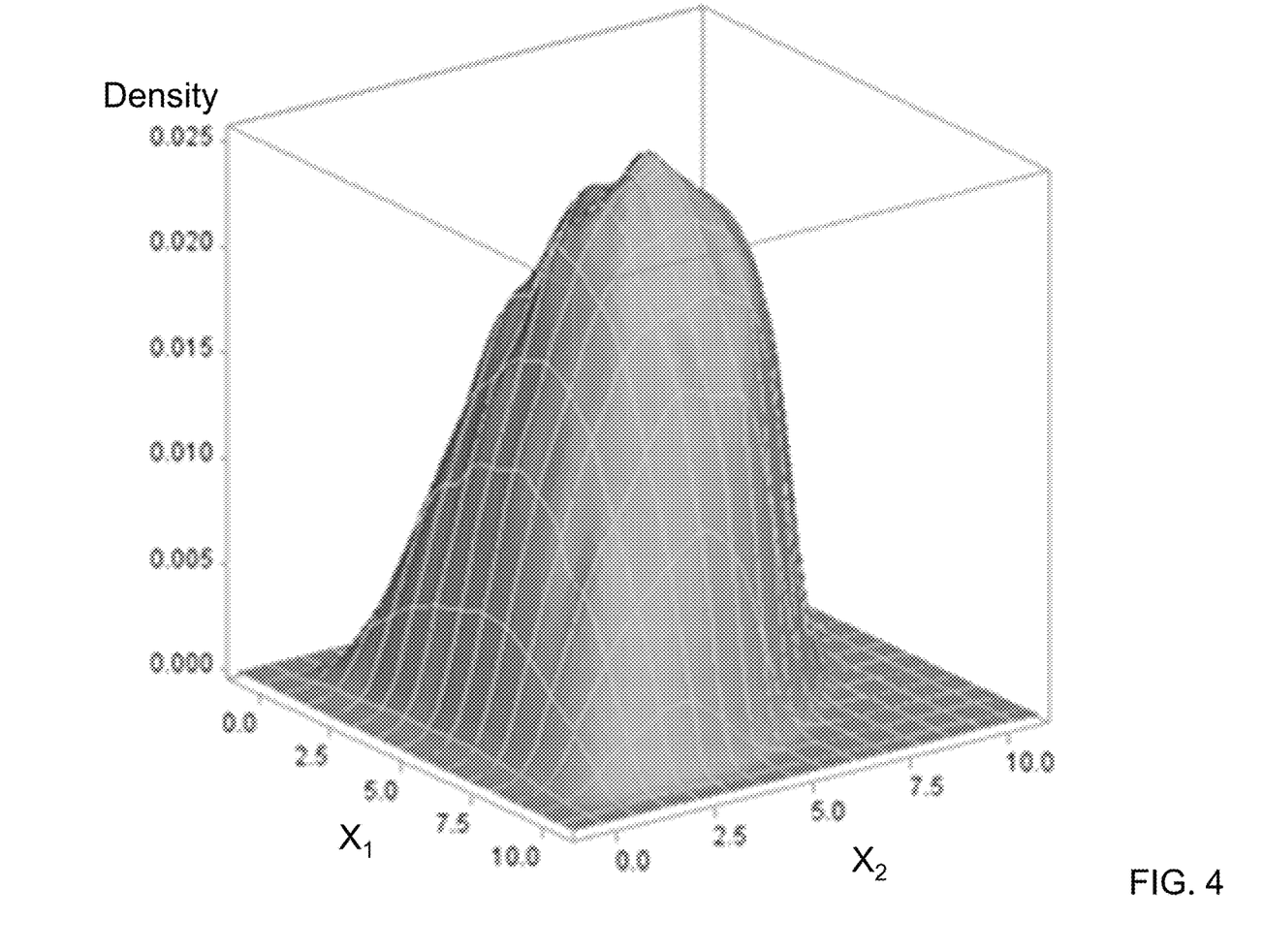
FIG. 4 depicts a density function defined for two known variables after application of constraint functions in accordance with an illustrative embodiment.

In an operation 218, a determination is made concerning whether the computed values satisfy any of the zero or more constraint functions indicated in operation 206 that involve only known variables. When the computed values satisfy all of the constraint functions, if any, processing continues in an operation 220. Otherwise, processing continues in operation 216 to compute new values. For example, given the constraint functions $X_1>0$; $X_2>2$; $X_U>2$; $X_1+X_2 \geq 4X_U$, $X_1>0$ and $X_2>2$ can be evaluated using the values computed for $X_1$ and $X_2$ in operation 216. For illustration, referring to FIG. 4, the density of FIG. 3 is shown for the two known variables $X_1$ and $X_2$ after application of the constraint functions $X_1>0$ and $X_2>2$ in accordance with an illustrative embodiment.

In operation 220, the unknown variable value is computed using the value computed for each known variable of the one or more known variables. For example, the equation to solve for the unknown variable is $X^2=[X_1, \ldots, X_{N_{vK}}, X_U]\rho[X_1, \ldots, X_{N_{vK}}, X_U]^T$, where X is the aggregate value indicated in operation 200, $\rho$ indicates the correlation matrix defined in operation 204, $X_1, \ldots, X_{N_{vK}}$ indicates the one or more known variables where the one or more known variables may be simply $X_1$, $X_U$ indicates the unknown variable, and T indicates a transpose. For example, $X^2=X_1^2+X_u^2+2\rho_2 X_1 X_U$ when $N_{vK}=1$, and $X^2=X_1^2+X_2^2+X_u^2+2\rho_1 X_1 X_2+2\rho_2 X_1 X_U+2\rho_3 X_2 X_U$ when $N_{84\ K}=2$.

Regardless of the number of known variables, the equation simplifies to a quadratic equation of the form $0=\alpha X_u^2+bX_u+c$ that can be solved using the quadratic equation $$X_u = \frac{-b \pm \sqrt{b^2-4ac}}{2a}.$$

Figure 5:
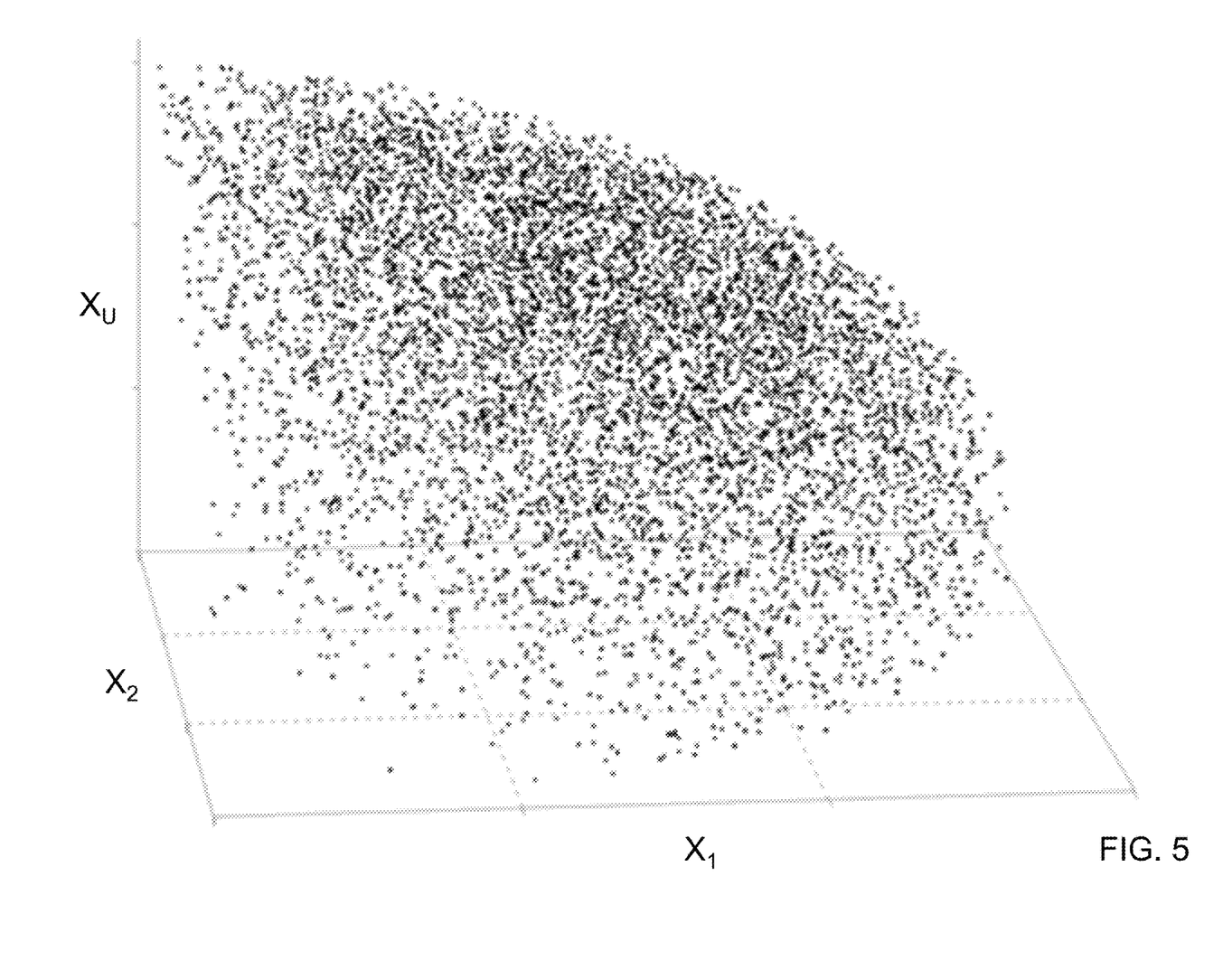
FIG. 5 depicts a point cloud for the two known variables and an unknown variable computed from respective values of the two known variables in accordance with an illustrative embodiment.

For example, $X_u^2+2\rho_2 X_1 X_U+(X_1^2-X^2)=0$ when $N_{vK}=1$, meaning $\alpha=1$, $b=2\rho_2 X_1$, and $c=X_1^2-X^2$. As another example, $X_u^2+(2\rho_2 X_1+2\rho_3 X_2)X_U+(X_1^2+X_2^2-2\rho_1 X_1 X_2)=0$ when $N_{vK}=2$, meaning $\alpha=1$, $b=2\rho_2 X_1+2\rho_3 X_2$, and $c=X_1^2+X_2^2-X^2+2\rho_1 X_1 X_2$. Both roots may be included as solutions for $X^u$ when there is a real solution for $b^2-4\alpha c$. Referring to FIG. 5, a point cloud is shown for the two known variables $X_1$ and $X_2$ and the unknown variable $X_u$ computed from the respective values of the two known variables $X_1$ and $X_2$ in accordance with an illustrative embodiment.

Figure 6:
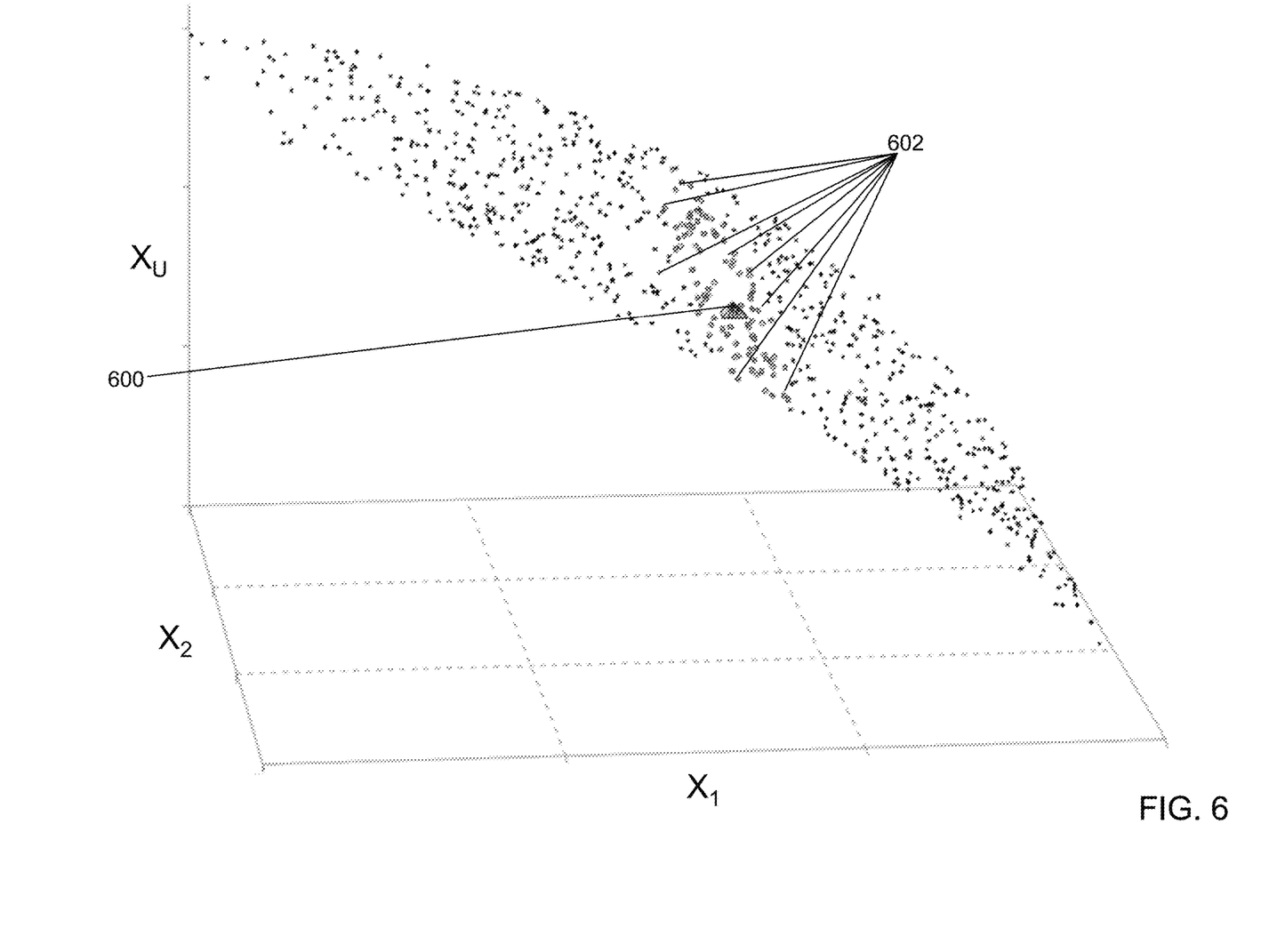
FIG. 6 depicts a point cloud for the two known variables and an unknown variable computed from respective values of the two known variables after application of constraint functions in accordance with an illustrative embodiment.

In an operation 222, a determination is made concerning whether the computed values for the known variables and for the unknown variable satisfy any of the remaining constraint functions indicated in operation 206 that involve the unknown variable. When the computed values satisfy all of the remaining constraint functions, processing continues in an operation 224. Otherwise, processing continues in operation 216 to compute new values. For example, given the constraint functions $X_1>0$; $X_2>2$; $X_U>2$; $X_1+X_2 \geq 4X_U$, $X_U>2$ and $X_1+X_2 \geq 4X_U$ can be evaluated using the values computed for $X_1$ and $X_2$ in operation 216 and the value for $X_U$ computed in operation 220. For example, referring to FIG. 6, a second point cloud is shown for the two known variables $X_1$ and $X_2$ and the unknown variable $X_U$ after application of the constraint functions $X_U>2$ and $X_1+X_2 \geq 4X_U$ in accordance with an illustrative embodiment.

In operation 224, the computed values for the one or more known variables and the unknown variable that define a solution vector are stored to computer-readable medium 108, for example, in an array or list.

In an operation 226, a determination is made concerning whether there is another solution to compute. When there is another solution to compute, processing continues in an operation 228. When there is not another solution to compute, processing continues in operation 232 shown referring to FIG. 2B. For example, there is another solution to compute when I<$N_s$.

In operation 228, solution counter I is incremented, for example, as I=I+1, and processing continues in operation 216 to compute new values.

Referring to FIG. 2B, in operation 232, a centroid vector is computed from the solution vectors stored in operation 224 using the centroid determination algorithm indicated in operation 210. For example, referring to FIG. 6, a centroid vector location 600 is shown that is computed from the second point cloud. A cluster center may be computed by executing the centroid determination algorithm indicated in operation 210 to cluster the solution vectors stored in operation 224 into a single cluster. The cluster center may define the centroid vector for the solution vectors stored in operation 224.

In an operation 234, the number of solutions to output $N_o$ indicated in operation 212 are determined as the solution vectors having the closest distance value to the computed centroid vector. For illustration, a Euclidean distance value may be computed between each solution vector stored in operation 224 and the computed centroid vector and the $N_o$ solution vectors having minimum values are determined as the solution vectors. For example, referring to FIG. 6, a plurality of solution vector locations 602 indicated with a ° are the 100 closest solution vectors computed from the second point cloud. Not all of the closest solution vectors can be indicated by the plurality of solution vector locations 602 due to crowding.

In an operation 236, the determined closest solution vectors are output, for example, to solution data 124, to display 116, to printer 120, etc. Without using disaggregation application 122, there are an infinite number of possible solution vectors for the one or more known variables and the unknown variable. The determined closest solution vectors define on average a best set of solution vectors that describe an allocation or attribution of the aggregate value to different levels based on what each variable represents.

Operations 200 through 236 describe the computation for a single set of known variables with an unknown variable. As $N_v$ increases, the size of the correlation matrix and the number of correlation values increases. To maintain a smaller correlation matrix, the one or more known variables and the unknown variable can be divided into a hierarchy of levels. For example, referring to FIG. 7, a block diagram of a hierarchy 700 of disaggregated variables is shown in accordance with an illustrative embodiment. Hierarchy 700 starts from a total node 702 that represents the aggregate value, for example, indicated in operation 200. A first level 704 includes a variable A node 706 that represents a known variable A and a variable B node 708 that represents an unknown variable B. A first iteration of operations 202 through 232 determines a centroid vector for the solution vectors for A and B from which a closest solution vector can be selected.

Figure 7:
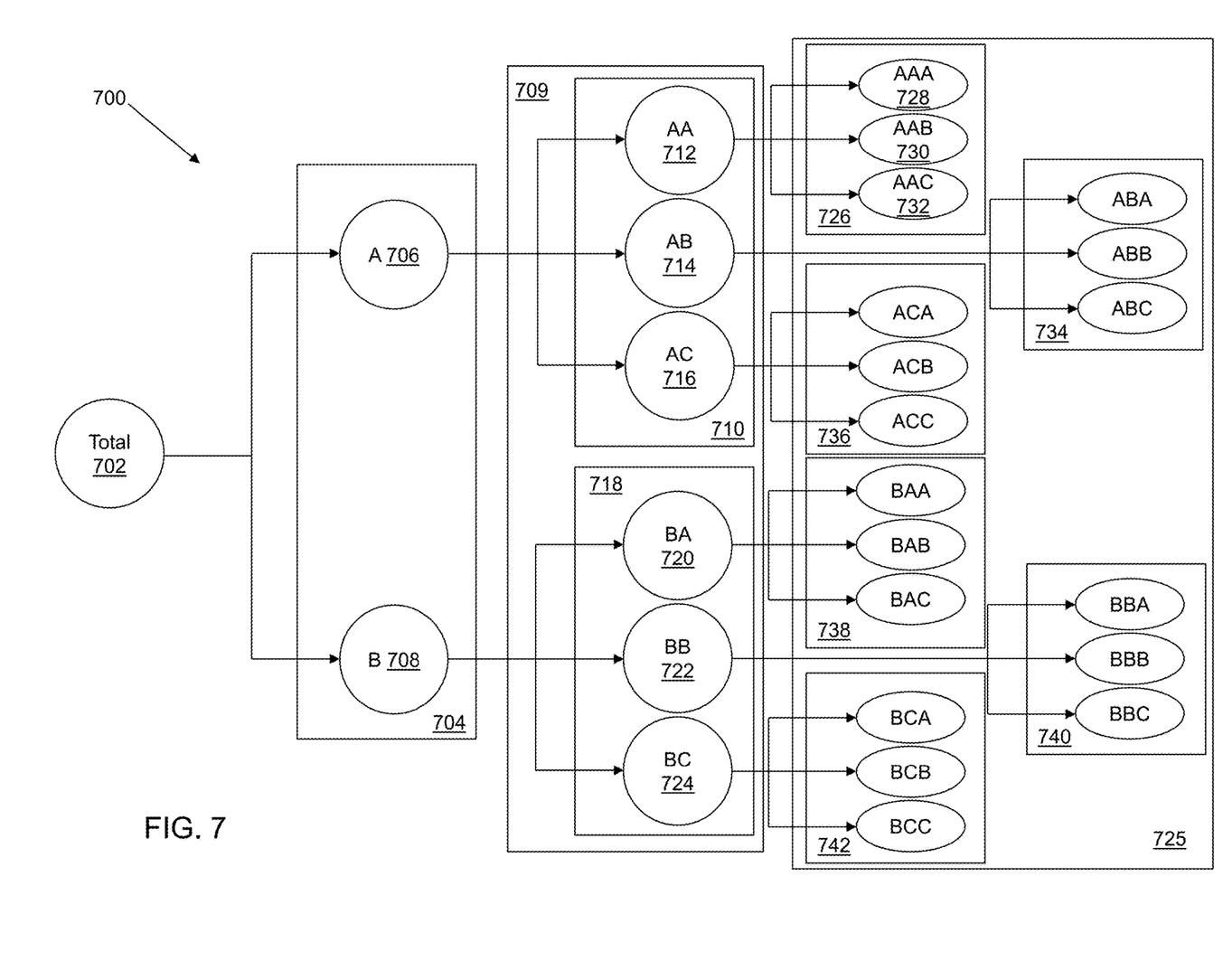
FIG. 7 shows a block diagram of a hierarchy of disaggregated variables in accordance with an illustrative embodiment.

A second level 709 includes a first sublevel 710 and a second sublevel 718. First sublevel 710 includes a variable AA node 712 that represents a known variable AA, a variable AB node 714 that represents a known variable AB, and a variable AC node 716 that represents an unknown variable AC. A second iteration of operations 202 through 232 is performed with the known variable A solution from the closest solution vector for first level 704 as the aggregate value to determine a centroid vector of the solution vectors for AA, AB, and AC from which a closest solution vector can be selected.

Second sublevel 718 includes a variable BA node 720 that represents a known variable BA, a variable BB node 722 that represents a known variable BB, and a variable BC node 724 that represents an unknown variable BC. A third iteration of operations 202 through 232 is performed with the unknown variable B solution from the closest solution vector for first level 704 as the aggregate value to determine a centroid vector of the solution vectors for BA, BB, and BC from which a closest solution vector can be selected.

A third level 725 includes a third sublevel 726, a fourth sublevel 734, a fifth sublevel 736, a sixth sublevel 738, a seventh sublevel 740, and an eighth sublevel 742. Third sublevel 726 includes a variable AAA node 728 that represents a known variable AAA, a variable AAB node 730 that represents a known variable AAB, and a variable AAC node 732 that represents an unknown variable AAC. A fourth iteration of operations 202 through 232 is performed with the known variable AA solution from the closest solution vector for first sublevel 710 as the aggregate value to determine a centroid vector of the solution vectors for AAA, AAB, and AAC from which a closest solution vector can be selected.

Similar iterations of operations 202 through 232 can be applied to fourth sublevel 734, fifth sublevel 736, sixth sublevel 738, seventh sublevel 740, and eighth sublevel 742 to determine respective centroid vectors of the solution vectors for ABA, ABB, and ABC, for ACA, ACB, and ACC, for BAA, BAB, and BAC, for BBA, BBB, and BBC, and for BCA, BCB, and BCC. For a last level of hierarchy 700, the $N_o$ closest number of solution vectors may be output. For example, the last level of hierarchy 700 is third level 725 that includes third sublevel 726, fourth sublevel 734, fifth sublevel 736, sixth sublevel 738, seventh sublevel 740, and eighth sublevel 742.

Operations 202 through 232 for each sublevel of the hierarchy are independent so they can be performed in parallel using a plurality of threads and/or a plurality of computing devices. For example, the operations for first sublevel 710 can be performed using a first computing device or thread and the operations for second sublevel 718 can be performed using a second computing device or thread. As another example, the operations for third sublevel 726 can be performed using the first computing device or thread, the operations for fourth sublevel 734 can be performed using the second computing device or thread, the operations for fifth sublevel 736 can be performed using a third computing device or thread, the operations for sixth sublevel 738 can be performed using a fourth computing device or thread, the operations for seventh sublevel 740 can be performed using a fifth computing device or thread, and the operations for eighth sublevel 742 can be performed using a sixth computing device or thread. Of course, the distribution of the computations for each level may be based on the number of computing devices and/or threads.

Referring to FIG. 2C, operations to determine solution vectors for a hierarchy of disaggregated variables are shown in accordance with an illustrative embodiment. In an operation 240, an eighth indicator of a number of hierarchy levels $N_L$ may be received. For illustration, hierarchy 700 includes three levels.

Similar to operation 200, in an operation 242, the first indicator is received that indicates the aggregate value.

In an operation 244, a level counter L is initialized, for example, as L=1.

In an operation 246, operations 202 through 232 are performed for the first level of the hierarchy.

In an operation 248, a determination is made concerning whether this is the last level to process. When this is the last level to process, processing continues in an operation 256. When this is not the last level to process, processing continues in an operation 250. For example, this is the last level to process when $L=N_L$.

In operation 250, a closest solution vector to the centroid vector computed in operation 232 is determined from the solution vectors stored in operation 224 for the associated level/sublevel. For example, using hierarchy 700, the closest solution vector to the centroid vector is determined for first level 704 that defines values for the known variable A and the unknown variable B that are used as the aggregate value for the computations of first sublevel 710 and second sublevel 718, respectively.

In an operation 252, operations 202 through 232 are performed for each sublevel of the next level of the hierarchy. For example, using hierarchy 700, operations 202 through 232 are performed for first sublevel 710 associated with known variable A to define a centroid vector and a plurality of solution vectors for known variable AA, known variable AB, and unknown variable AC, and operations 202 through 232 are performed for second sublevel 718 associated with unknown variable B to define a centroid vector and a plurality of solution vectors for known variable BA, known variable BB, and unknown variable BC.

In an operation 254, level counter L is incremented, for example, as L=L+1, and processing continues in operation 248 to process the next level.

Similar to operation 250, in operation 256, a closest solution vector to the centroid vector computed in operation 232 is determined from the solution vectors stored in operation 224 for the last level.

Similar to operation 252, in operation 258, operations 202 through 232 are performed for each sublevel of the last level of the hierarchy.

Similar to operation 234, in operation 260, the number of solutions to output $N_o$ indicated in operation 212 are determined as the solution vectors having the closest distance value to the centroid vector computed for each sublevel.

Similar to operation 236, in operation 262, the determined closest solution vectors are output for each sublevel, for example, to solution data 124, to display 116, to printer 120, etc.

Use of the hierarchy of disaggregated variables reduces the size of the correlation matrices that are needed. For example, hierarchy 700 requires an 18×18 matrix using operations 200 through 236. However, using operations 240 through 262, hierarchy 700 uses a 2×2 correlation matrix for first level 704, two 3×3 correlation matrices for second level 709, and six 3×3 correlation matrices for third level 725 that are smaller. For example, hierarchy 700 requires 18*17/2=153 correlation values using operations 200 through 236; whereas, hierarchy 700 requires 2*1/2+3*2/2*2+3*2/2*6=25 correlation values using operations 240 through 262. Using operations 240 through 262 requires much fewer correlation values than using operations 200 through 236.

For illustration, the aggregate value may be a total value at risk. Levels for the total value at risk may be based on geography (e.g., level 1), a risk type (e.g., level 2), a counterparty (e.g., level 3), etc. For illustration, the geography may be based on a city, a county/region, a state, a country, etc. For illustration, the risk type may be a market risk type, a credit risk type, an operation risk type, etc. For illustration, the counterparty may represent an entity or an individual.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

(A) compute a first value for a known variable using a predefined density distribution function;

(B) compute a second value for an unknown variable using the computed first value, a predefined correlation value, and a predefined aggregate value, wherein the predefined correlation value indicates a correlation between the known variable and the unknown variable;

(C) repeat (A) and (B) until a predefined number of solution vectors is computed, wherein a solution vector is the computed first value and the computed second value;

(D) compute a centroid vector from solution vectors computed by repeating (A) and (B) in (C);

(E) determine a predefined number of closest solution vectors to the computed centroid vector from the solution vectors;

(F) select a first solution vector from the predefined number of closest solution vectors;

(G) define a first aggregate value that is a value of the known variable in the selected first solution vector;

(H) compute a third value for a second known variable using a second predefined density distribution function;

(I) compute a fourth value for a second unknown variable using the computed third value, a second predefined correlation value, and the defined first aggregate value, wherein the second predefined correlation value indicates a correlation between the second known variable and the second unknown variable;

(J) repeat (H) and (I) until the predefined number of solution vectors is computed to define second solution vectors, wherein a second solution vector is the computed third value and the computed fourth value;

(K) compute a second centroid vector from the defined second solution vectors;

(L) determine a second predefined number of closest solution vectors to the computed second centroid vector from the defined second solution vectors;

(M) define a second aggregate value that is a value of the unknown variable in the selected first solution vector;

(N) compute a fifth value for a third known variable using a third predefined density distribution function;
(O) compute a sixth value for a third unknown variable using the computed fifth value, a third predefined correlation value, and the defined second aggregate value, wherein the third predefined correlation value indicates a correlation between the third known variable and the third unknown variable;
(P) repeat (N) and (O) until the predefined number of solution vectors is computed to define third solution vectors, wherein a third solution vector is the computed fifth value and the computed sixth value;
(Q) compute a third centroid vector from the defined third solution vectors;
(R) determine a third predefined number of closest solution vectors to the computed third centroid vector from the defined third solution vectors; and
(S) output the determined second predefined number of closest solution vectors and the determined third predefined number of closest solution vectors as disaggregated solutions given the predefined aggregate value.

2. The non-transitory computer-readable medium of claim 1, wherein a number of the predefined number of closest solution vectors is one.

3. The non-transitory computer-readable medium of claim 1, wherein the predefined density distribution function is a beta distribution function.

4. The non-transitory computer-readable medium of claim 1, wherein the second value is computed as a solution of a quadratic equation, wherein parameters of the quadratic equation are determined from the computed first value, the predefined correlation value, and the predefined aggregate value.

5. The non-transitory computer-readable medium of claim 4, wherein the quadratic equation is defined using $X_u^2 + 2\rho_1 X_1 X_U + (X_1^2 - X^2) = 0$, where $X_1$ indicates the computed first value, $X_U$ indicates the computed second value, $X$ indicates the predefined aggregate value, and $\rho_1$ indicates the predefined correlation value.

6. The non-transitory computer-readable medium of claim 5, wherein the parameters of the quadratic equation are determined using $\alpha=1$, $b=2\rho_1 X_1$, and $c=X_1^2-X^2$.

7. The non-transitory computer-readable medium of claim 1, wherein after (A) and before (B), the computer-readable instructions further cause the computing device to compute a seventh value for a fourth known variable using a fourth predefined density distribution function, wherein the second value for the unknown variable is further computed using the computed seventh value.

8. The non-transitory computer-readable medium of claim 7, wherein the second value is computed as a solution of a quadratic equation, wherein parameters of the quadratic equation are determined from the computed first value, the computed seventh value, the predefined correlation value, and the predefined aggregate value.

9. The non-transitory computer-readable medium of claim 8, wherein the quadratic equation is defined using $X_u^2 + (2\rho_2 X_1 + 2\rho_3 X_2) X_U + (X_1^2 + X_2^2 - X^2 + 2\rho_1 X_1 X_2) = 0$, where $X_1$ indicates the computed first value, $X_2$ indicates the computed seventh value, $X_U$ indicates the computed second value, $X$ indicates the predefined aggregate value, $\rho_1$ indicates a predefined correlation value that indicates the correlation between the known variable and the fourth known variable, $\rho_2$ indicates the predefined correlation value, and $\rho_3$ indicates a predefined correlation value that indicates the correlation between the fourth known variable and the unknown variable.

10. The non-transitory computer-readable medium of claim 9, wherein the parameters of the quadratic equation are determined using $\alpha=1$, $b=2\rho_2 X_1 + 2\rho_3 X_2$, and $c=X_1^2 + X_2^2 - X^2 + 2\rho_1 X_1 X_2$.

11. The non-transitory computer-readable medium of claim 1, wherein after (A) and before (B), the computer-readable instructions further cause the computing device to determine a result of a constraint function applied to the computed first value, wherein when the constraint function is not satisfied with the computed first value, (A) is repeated.

12. The non-transitory computer-readable medium of claim 11, wherein after (B) and before (C), the computer-readable instructions further cause the computing device to determine a second result of a second constraint function applied to the computed first value and/or the computed second value, wherein when the second constraint function is not satisfied with the computed first value and/or the computed second value, (A) and (B) are repeated.

13. The non-transitory computer-readable medium of claim 1, wherein after (B) and before (C), the computer-readable instructions further cause the computing device to determine a result of a constraint function applied to the computed first value and/or the computed second value, wherein when the constraint function is not satisfied with the computed first value and/or the computed second value, (A) and (B) are repeated.

14. The non-transitory computer-readable medium of claim 1, wherein computing the centroid vector comprises computing a center for the solution vectors using a clustering algorithm to define a single cluster.

15. The non-transitory computer-readable medium of claim 14, wherein the clustering algorithm is a k-means clustering algorithm.

16. The non-transitory computer-readable medium of claim 1, wherein determining the predefined number of closest solution vectors comprises computing a distance value between each solution vector and the computed centroid vector.

17. The non-transitory computer-readable medium of claim 16, wherein the distance value is computed as a Euclidian distance.

18. The non-transitory computer-readable medium of claim 16, wherein the predefined number of closest solution vectors have a minimum distance value relative to other distance values for other solution vectors not included in the predefined number of closest solution vectors.

19. The non-transitory computer-readable medium of claim 7, wherein after (F) and before (S), the computer-readable instructions further cause the computing device to:
(T) define a third aggregate value that is a value of the fourth known variable in the selected first solution vector, wherein the solution vector further includes the computed seventh value;
(U) compute an eighth value for a fifth known variable using a fifth predefined density distribution function;
(V) compute a ninth value for a fourth unknown variable using the computed sixth value, a fourth predefined correlation value, and the defined third aggregate value, wherein the second fourth predefined correlation value indicates a correlation between the fifth known variable and the fourth unknown variable;
(W) repeat (U) and (V) until the predefined number of solution vectors is computed to define fourth solution vectors, wherein a fourth solution vector is the computed eighth value and the computed ninth value; and
(X) compute a fourth centroid vector from the defined fourth solution vectors; and determine a fourth predefined number of closest solution vectors to the computed fourth centroid vector from the defined fourth solution vectors, wherein the fourth predefined number of closest solution vectors are further output in (S).

20. The non-transitory computer-readable medium of claim 1, wherein the predefined density distribution function, the second predefined density distribution function, and the third predefined density distribution function are each a beta distribution function.

21. The non-transitory computer-readable medium of claim 1, wherein (H)-(L) are performed by a first computing device, and (M)-(R) are performed by a second computing device.

22. The non-transitory computer-readable medium of claim 1, wherein (H)-(L) are performed by a first thread of the computing device, and (M)-(R) are performed by a second thread of the computing device.

23. The non-transitory computer-readable medium of claim 1, wherein a parameter of each of the predefined density distribution function, the second predefined density distribution function, and the third predefined density distribution function is defined separately.

24. The non-transitory computer-readable medium of claim 1, wherein the first aggregate value represents a first geographical location, and the second aggregate value represents a second geographical location.

25. The non-transitory computer-readable medium of claim 1, wherein the predefined aggregate value represents a value at risk.

26. The non-transitory computer-readable medium of claim 25, wherein the known variable and the unknown variable each represent a different counterparty risk.

27. The non-transitory computer-readable medium of claim 1, wherein the predefined aggregate value represents a production level for a product.

28. The non-transitory computer-readable medium of claim 27, wherein the known variable and the unknown variable each represent a different resource allocation for manufacturing the product.

29. A computing device comprising:
a processor; and
a non-transitory computer-readable medium operably coupled to the processor, the computer-readable medium having computer-readable instructions stored thereon that, when executed by the processor, cause the computing device to
(A) compute a first value for a known variable using a predefined density distribution function;
(B) compute a second value for an unknown variable using the computed first value, a predefined correlation value, and a predefined aggregate value, wherein the predefined correlation value indicates a correlation between the known variable and the unknown variable;
(C) repeat (A) and (B) until a predefined number of solution vectors is computed, wherein a solution vector is the computed first value and the computed second value;
(D) compute a centroid vector from solution vectors computed by repeating (A) and (B) in (C);
(E) determine a predefined number of closest solution vectors to the computed centroid vector from the solution vectors;
(F) select a first solution vector from the predefined number of closest solution vectors;
(G) define a first aggregate value that is a value of the known variable in the selected first solution vector;
(H) compute a third value for a second known variable using a second predefined density distribution function;
(I) compute a fourth value for a second unknown variable using the computed third value, a second predefined correlation value, and the defined first aggregate value, wherein the second predefined correlation value indicates a correlation between the second known variable and the second unknown variable;
(J) repeat (H) and (I) until the predefined number of solution vectors is computed to define second solution vectors, wherein a second solution vector is the computed third value and the computed fourth value;
(K) compute a second centroid vector from the defined second solution vectors;
(L) determine a second predefined number of closest solution vectors to the computed second centroid vector from the defined second solution vectors;
(M) define a second aggregate value that is a value of the unknown variable in the selected first solution vector;
(N) compute a fifth value for a third known variable using a third predefined density distribution function;
(O) compute a sixth value for a third unknown variable using the computed fifth value, a third predefined correlation value, and the defined second aggregate value, wherein the third predefined correlation value indicates a correlation between the third known variable and the third unknown variable;
(P) repeat (N) and (O) until the predefined number of solution vectors is computed to define third solution vectors, wherein a third solution vector is the computed fifth value and the computed sixth value;
(Q) compute a third centroid vector from the defined third solution vectors;
(R) determine a third predefined number of closest solution vectors to the computed third centroid vector from the defined third solution vectors; and
(S) output the determined second predefined number of closest solution vectors and the determined third predefined number of closest solution vectors as disaggregated solutions given the predefined aggregate value.

30. A method of determining a disaggregated solution vector of a plurality of variables, the method comprising:
(A) computing, by a computing device, a first value for a known variable using a predefined density distribution function;
(B) computing, by the computing device, a second value for an unknown variable using the computed first value, a predefined correlation value, and a predefined aggregate value, wherein the predefined correlation value indicates a correlation between the known variable and the unknown variable;
(C) repeating, by the computing device, (A) and (B) until a predefined number of solution vectors is computed, wherein a solution vector is the computed first value and the computed second value;
(D) computing, by the computing device, a centroid vector from solution vectors computed by repeating (A) and (B) in (C);

(E) determining, by the computing device, a predefined number of closest solution vectors to the computed centroid vector from the solution vectors;
(F) selecting, by the computing device, a first solution vector from the predefined number of closest solution vectors;
(G) defining, by the computing device, a first aggregate value that is a value of the known variable in the selected first solution vector;
(H) computing, by the computing device, a third value for a second known variable using a second predefined density distribution function;
(I) computing, by the computing device, a fourth value for a second unknown variable using the computed third value, a second predefined correlation value, and the defined first aggregate value, wherein the second predefined correlation value indicates a correlation between the second known variable and the second unknown variable;
(J) repeating, by the computing device, (H) and (I) until the predefined number of solution vectors is computed to define second solution vectors, wherein a second solution vector is the computed third value and the computed fourth value;
(K) computing, by the computing device, a second centroid vector from the defined second solution vectors;
(L) determining, by the computing device, a second predefined number of closest solution vectors to the computed second centroid vector from the defined second solution vectors;
(M) defining, by the computing device, a second aggregate value that is a value of the unknown variable in the selected first solution vector;
(N) computing, by the computing device, a fifth value for a third known variable using a third predefined density distribution function;
(O) computing, by the computing device, a sixth value for a third unknown variable using the computed fifth value, a third predefined correlation value, and the defined second aggregate value, wherein the third predefined correlation value indicates a correlation between the third known variable and the third unknown variable;
(P) repeating, by the computing device, (N) and (O) until the predefined number of solution vectors is computed to define third solution vectors, wherein a third solution vector is the computed fifth value and the computed sixth value;
(Q) computing, by the computing device, a third centroid vector from the defined third solution vectors;
(R) determining, by the computing device, a third predefined number of closest solution vectors to the computed third centroid vector from the defined third solution vectors; and
(S) outputting, by the computing device, the determined second predefined number of closest solution vectors and the determined third predefined number of closest solution vectors as disaggregated solutions given the predefined aggregate value.

\* \* \* \* \*

UNITED STATES PATENT AND TRADEMARK OFFICE
CERTIFICATE OF CORRECTION

PATENT NO. : 11,704,388 B2
APPLICATION NO. : 17/862510
DATED : July 18, 2023
INVENTOR(S) : Christian Macaro et al.

Page 1 of 2

It is certified that error appears in the above-identified patent and that said Letters Patent is hereby corrected as shown below:

In the Specification

Column 7, Line 11:
Delete the phrase "$X_2 4X_U;$" and replace with --$X_2 \geq 4X_U;$--.

Column 8, Line 24:
Delete the phrase "$N_{84\ K} = 2.$" and replace with --$N_{vk} = 2.$--.

Column 8, Line 37:
Delete the phrase "$\alpha = 1,$" and replace with --$a = 1,$--.

In the Claims

Claim 5, Column 13, Lines 35-36:
Delete the phrase "$X_u^2 + 2\rho_1 X_1 X_U + (X_1^2 - X^2) = 0,$" and replace with
--$X_u^2 + 2\rho_1 X_1 X_U + (X_1^2 - X^2) = 0,$--.

Claim 6, Column 13, Line 42:
Delete the phrase "$\alpha = 1, b = 2\rho_1 X_1,$ and $c = X_1^2 - X^2.$" and replace with
--$a = 1, b = 2\rho_1 X_1,$ and $c = X_1^2 - X^2.$--.

Claim 9, Column 13, Lines 57-58:
Delete the phrase "$X_u^2 + (2\rho_2 X_1 + 2\rho_3 X_2) X_U + (X_1^2 + X_2^2 - X^2 + 2\rho_1 X_1 X_2) = 0,$" and replace with
--$X_u^2 + (2\rho_2 X_1 + 2\rho_3 X_2) X_U + (X_1^2 + X_2^2 - X^2 + 2\rho_1 X_1 X_2) = 0,$--.

Claim 10, Column 14, Lines 3-4:
Delete the phrase "$\alpha = 1, b = 2\rho_2 X_1 + 2\rho_3 X_2,$ and $c = X^2{}_1 + X^2{}_2 - X^2 + 2\rho_1 X_1 X_2.$" and replace with
--$a = 1, b = 2\rho_2 X_1 + 2\rho_3 X_2,$ and $c = X_1^2 + X_2^2 - X^2 + 2\rho_1 X_1 X_2.$--.

Signed and Sealed this
Twelfth Day of September, 2023

Katherine Kelly Vidal
*Director of the United States Patent and Trademark Office*

Claim 19, Column 14, Line 59:
Delete the phrase "the second fourth predefined" and replace with --the fourth predefined--.